July 8, 1930.   H. L. PELZER   1,770,287
ART OF CRACKING HYDROCARBON OILS
Filed April 11, 1928
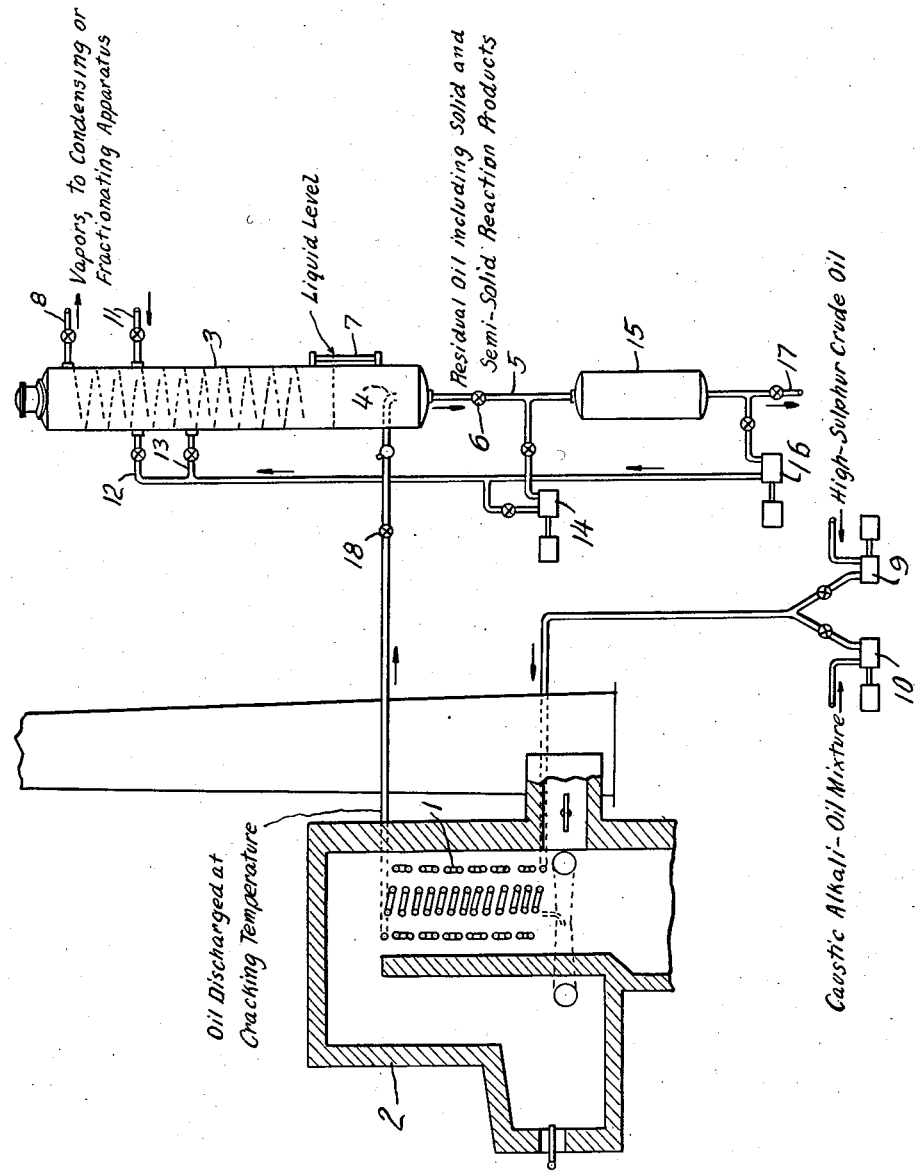
INVENTOR
Harry L. Pelzer
BY
ATTORNEYS Patented July 8, 1930

1,770,287

UNITED STATES PATENT OFFICE

HARRY L. PELZER, OF HIGHLAND, INDIANA, ASSIGNOR TO SINCLAIR REFINING COMPANY, OF NEW YORK, N. Y., A CORPORATION OF MAINE

ART OF CRACKING HYDROCARBON OILS

Application filed April 11, 1928. Serial No. 269,288.

This invention relates to improvements in the distillation of high-sulphur crude petroleums or topped crude petroleums, containing, for example, 1% or 2% or more of sulphur. The invention is of special value and application in connection with crude oils containing sulphur in form such that it is not easily or economically removed by the usual refining methods or such that it causes severe corrosion of the usual distillation apparatus.

According to this invention, the high-sulphur crude oil is mixed with a limited amount of a caustic alkali such as quick lime or caustic soda, this mixture is passed through a heated conduit in which it is heated to a cracking temperature, the hot oil products are discharged from the conduit into a liquid body of residual oil, vapors are taken off from this liquid body and subjected to any desired condensing or fractionating operations, and residual oil including any unconsumed caustic alkali and the solid or semi-solid reaction products of the caustic alkali is discharged from this liquid body. This discharged residual oil including such reaction products is not permitted again to pass as such through the heated conduit. The amount of the caustic alkali is adjusted in accordance with the amount and character of the sulphur compounds present in the oil; usually an amount of either quick lime or caustic soda approximating 1¼–2½ pounds per barrel of oil is sufficient, although where the sulphur compounds in the oil are very large in amount or very refractory in character as much as 4–7 pounds per barrel or more may be used. Solids or semi-solids are maintained in suspension in the oil during passage through the heated conduit by maintaining a high velocity of flow therethrough; the initial velocity of the oil mixture as it enters the heated conduit should be not less than 6 feet per second and higher initial velocities may be maintained where a large amount of caustic alkali is used. Any separation of vapors and gases as the oil mixture flows through the heated conduit tends to increase the velocity of flow due to the resulting increase in volume and this tendency offsets any reduction in carrying capacity of the remaining liquid oil. At a cracking temperature, upwards of 700° F., the caustic alkali is particularly effective in combining with or breaking up the objectionable sulphur compounds in the oil; in carrying out this invention the caustic alkali is maintained in intimate contact with the oil as it is heated to the cracking temperature as well as while it is at the cracking temperature. By discharging the hot oil products from the heated conduit into a liquid body of residual oil the escaping vapors are subjected to scrubbing treatment promoting separation of heavy but nevertheless vaporizable sulphur compounds and any unconsumed caustic alkali and the solid or semi-solid reaction products of the caustic alkali while at the same time further opportunity for reaction between the caustic alkali and sulphur compounds in the oil is afforded. Vapors are taken off from this liquid body, for example, vapors of all fractions through the usual gas oil cut or the vaporization may be carried to a point where the liquid residue remaining is just sufficiently fluid to permit discharge. These vapors may be fractionated or condensed in any conventional manner. Any unconsumed caustic alkali and the solid or semi-solid reaction products of the caustic alkali are discharged from this liquid body in suspension in the accumulating residual oil. Further decomposition of the reaction products of the caustic alkali or progressive concentration of such sulphur compounds in the oil flowing through the heated conduit is avoided by avoiding repassage of the discharged residual oil including such reaction products through the heated conduit. Further oil components may be vaporized from the discharged residual oil by reducing the pressure thereon while hot or solid or semi-solid material may be separated from the discharged residual oil by settling operations.

The invention will be further described in connection with the accompanying drawings which illustrate, diagrammatically and conventionally, in elevation and partly in section and with parts broken away, one apparatus adapted for carrying out the invention.

The particular apparatus shown is shown merely for purposes of illustration.

In carrying out the invention in the apparatus illustrated, a mixture of the high-sulphur crude oil and a caustic alkali is forced through the pipe coil 1 arranged in the heating flue of the heating furnace 2, is heated in the pipe coil to a cracking temperature, and then is discharged into the lower end of the tower 3. A liquid body of oil submerging the discharge connection 4 from the pipe coil 1 is maintained in the lower end of the tower 3 and the hot oil products from the coil are, with advantage, discharged downwardly into the lower part of this liquid body to promote the scrubbing action of the liquid body. This liquid body is maintained by regulated discharge of residual oil through connection 5. This regulation may be effected by means of valve 6 and may be controlled to maintain some chosen liquid level through observations by means of a gauge glass 7, try-cocks or other suitable means. Vapors are taken off from this liquid body, uncondensed vapors escaping from the upper end of the tower 3 through connection 8.

The oil mixture supplied to the pipe coil 1 includes, for example, from 1 pound per barrel or more of quick lime or caustic soda. The oil mixture is supplied to the pipe coil 1 at a rate sufficient to maintain an initial velocity therethrough upwards of 6 feet per second. The oil mixture is discharged from the pipe coil 1 at a temperature upwards of 700° F. From 35 to 85% of the oil, for example, may be taken off through connection 8. The oil supplied to the pipe coil 1 may be a crude petroleum as it comes from the ground or a topped crude petroleum, that is crude petroleum from which lighter components have been removed.

Instead of mixing the caustic alkali directly with the total volume of crude oil, the caustic alkali is advantageously mixed with a relatively small portion of the crude oil or some other oil fraction and this reltively concentrated mixture then mixed with the major portion of the crude oil. This expedient simplifies the handling of the oil mixture and simplifies the control of the concentration of caustic alkali in the oil mixture. In the apparatus illustrated two pumps are provided; the high-sulphur crude oil or the major portion of this oil is supplied to the pipe coil 1 by means of pump 9 and a relatively concentrated oil mixture including the caustic alkali is supplied by means of pump 10.

In the apparatus illustrated, the upper end of the tower 3, above the normal liquid level maintained therein, is provided with baffles and some suitable scrubbing or refluxing medium is supplied, for example through connection 11 or connections 12 or 13, to strip the escaping vapors of all heavy components. A part of the discharged residual oil, for example, may be reintroduced into the upper end of the tower through connections 12 or 13, either while hot by means of pumps 14 or after passage through the cooler 15 by means of pump 16. Or, a gas oil fraction to be redistilled, for example, may be introduced into the upper end of the tower through connection 11 to act as a refluxing medium at the same time that it is vaporized in the tower to escape with the vapors escaping through connection 8.

Any unconsumed caustic alkali and the reaction products of the caustic alkali are discharged through connection 5 and ultimately through connection 17 in suspension in or in admixture with the residual oil discharged from the liquid body maintained in the lower end of the tower 3. This residual oil including any unconsumed caustic alkali and such reaction products is not permitted again to pass as such through the pipe coil 1.

The oil mixture may be supplied to the pipe coil 1 under just sufficient pressure to force the oil mixture therethrough and to effect the passage of the several oil products through the rest of the apparatus or the hot oil products may be discharged from the pipe coil 1 under a pressure substantially above atmospheric. For example, the hot oil products may be discharged from the pipe coil 1 under a pressure upwards of 50 pounds per square inch gauge pressure. This pressure is with advantage reduced before the hot oil products are discharged into the liquid body maintained in the lower end of the tower 3 to a value approximating atmospheric, by means of valve 18, for example, to assist in the separation of vaporizable components in the tower 3.

The vapors escaping through connection 8 may, for example, be discharged through a series of towers maintained at progressively lower temperatures separately to condense in the several towers successively lighter separate cuts or these vapors may be condensed to be redistilled in any conventional manner.

Corrosion due to the presence of sulphur compounds is particularly acute at higher temperatures. In carrying out this invention, the high-sulphur crude oil is in contact with the metal of the distillation apparatus used only in the presence of the caustic alkali until the mixture of caustic alkali and crude oil has been brought to the maximum temperature prevailing in any part of the distillation apparatus and throughout the operation the caustic alkali is more reactive with respect to the sulphur compounds present than the metal of the distillation apparatus by a margin sufficient to inhibit corrosion of this part of the distillation apparatus. After discharge from the heated conduit, the temperature of the oil, vaporized and unvaporized, gradually decreases so that any tendency toward corrosion of the apparatus diminishes from this point on. The oil vapors taken off from the liquid body into which the hot oil products are discharged from the heated conduit comprise only components which have been heated to a cracking temperature, in the heated conduit, while in intimate contact with the caustic alkali.

The invention is of special value and application in connection with the high-sulphur crude petroleums now produced in west Texas, and similar crude oils. In this aspect the invention makes available for the production of high grade oil products a large supply of relatively cheap crude oils, the use of which has hitherto involved expensive refining operations or the burden of corrosion losses.

I claim:

1. In the distillation of crude petroleum containing upwards of 1% of sulphur, the improvement which comprises mixing a caustic alkali with the crude oil, passing the mixture through a heated conduit at an initial velocity upwards of 6 feet per second and heating it therein to a cracking temperature, discharging the hot oil products from the conduit into a liquid body of residual oil, taking off vapors from said liquid body, and discharging residual oil including any unconsumed caustic alkali and the solid or semi-solid reaction products of the caustic alkali from the said liquid body without permitting such discharged residual oil including such reaction products again to pass through the heated conduit.

2. In the distillation of topped crude petroleum containing upwards of 1% of sulphur, the improvement which comprises mixing a caustic alkali with the crude oil, passing the mixture through a heated conduit at an initial velocity upwards of 6 feet per second and heating it therein to a cracking temperature, discharging the hot oil products from the conduit into a liquid body of residual oil, taking off vapors from said liquid body, and discharging residual oil including any unconsumed caustic alkali and the solid or semi-solid reaction products of the caustic alkali from the said liquid body without permitting such discharged residual oil including such reaction products again to pass through the heated conduit.

In testimony whereof, I have subscribed my name.

HARRY L. PELZER.